United States Patent
Ichihashi et al.

(10) Patent No.: US 10,061,187 B2
(45) Date of Patent: Aug. 28, 2018

(54) REFLECTION MEMBER AVAILABLE FOR HEAT SHIELD USE AND PROJECTOR INCLUDING REFLECTION MEMBER

(71) Applicant: FUJIFILM Corporation, Tokyo (JP)

(72) Inventors: Mitsuyoshi Ichihashi, Kanagawa (JP); Yuki Saiki, Kanagawa (JP); Kazuhiro Oki, Kanagawa (JP); Takao Taguchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/238,818

(22) Filed: Aug. 17, 2016

(65) Prior Publication Data

US 2016/0357096 A1 Dec. 8, 2016

Related U.S. Application Data

(63) Continuation of application No. PCT/JP2015/054594, filed on Feb. 19, 2015.

(30) Foreign Application Priority Data

Feb. 20, 2014 (JP) ................................. 2014-030463

(51) Int. Cl.
*G03B 21/16* (2006.01)
*H04N 9/31* (2006.01)
(Continued)

(52) U.S. Cl.
CPC ........... *G03B 21/16* (2013.01); *G02B 5/0808* (2013.01); *G02B 5/208* (2013.01); *G02B 5/26* (2013.01);
(Continued)

(58) Field of Classification Search
CPC .. G02B 27/0101; G02B 5/0808; G02B 5/208; G02B 5/26; G02B 5/3083; G03B 21/16; G03B 21/28
See application file for complete search history.

(56) References Cited

U.S. PATENT DOCUMENTS

| 7,495,719 B2 * | 2/2009 | Adachi | G02F 1/133536 349/74 |
| 2004/0095651 A1 * | 5/2004 | Aoki | G02B 27/0101 359/630 |

(Continued)

FOREIGN PATENT DOCUMENTS

| JP | 06-194517 A | 7/1994 |
| JP | 09-154046 A | 6/1997 |

(Continued)

OTHER PUBLICATIONS

Office Action dated Apr. 4, 2017, from the Japanese Patent Office in counterpart Japanese Application No. 2014-030463.

(Continued)

*Primary Examiner* — Bao-Luan Le
(74) *Attorney, Agent, or Firm* — Sughrue Mion, PLLC

(57) ABSTRACT

The present invention provides a reflection member including a selective reflection layer; and two ¼ wavelength phase difference plates, in which the selective reflection layer is disposed between the two ¼ wavelength phase difference plates, the selective reflection layer includes a layer of a fixed cholesteric liquid crystal phase having a central wavelength of selective reflection at a visible light range wavelength λi, and the selective reflection layer includes a layer in which a twisted direction of a helix of a cholesteric liquid crystal is only one of right or left as the layer of a fixed cholesteric liquid crystal phase having selective reflection at the wavelength λi. The reflection member of the present invention can be used particularly as a heat shielding mem- (Continued)

ber, which can reduce damage to the optical systems due to external light including visible light while efficiently extracting projected light.

18 Claims, 3 Drawing Sheets

(51) Int. Cl.
*G02B 5/08* (2006.01)
*G02B 5/20* (2006.01)
*G02B 5/26* (2006.01)
*G03B 21/28* (2006.01)
*G02B 27/01* (2006.01)
*G02B 5/30* (2006.01)

(52) U.S. Cl.
CPC ......... *G02B 27/0101* (2013.01); *G03B 21/28* (2013.01); *G02B 5/3083* (2013.01)

(56) References Cited

U.S. PATENT DOCUMENTS

| | | | |
|---|---|---|---|
| 2004/0100598 A1* | 5/2004 | Adachi | G02F 1/133536 349/113 |
| 2006/0018119 A1* | 1/2006 | Sugikawa | G02B 5/26 362/231 |
| 2006/0078692 A1* | 4/2006 | Murakami | G02B 5/3016 428/1.31 |
| 2008/0192358 A1* | 8/2008 | Watanabe | G02B 27/0101 359/633 |
| 2011/0097562 A1 | 4/2011 | Brill et al. | |
| 2013/0135748 A1* | 5/2013 | Sato | G02B 27/0101 359/630 |
| 2014/0177040 A1* | 6/2014 | Uehara | G02B 27/0101 359/352 |

FOREIGN PATENT DOCUMENTS

| | | |
|---|---|---|
| JP | 2000-046971 A | 2/2000 |
| JP | 2002-014229 A | 1/2002 |
| JP | 2003-131213 A | 5/2003 |
| JP | 2003-295105 A | 10/2003 |
| JP | 2005-315931 A | 11/2005 |
| JP | 4109914 B2 | 7/2008 |
| JP | 2011-525154 A | 9/2011 |
| JP | 5012171 B2 | 8/2012 |

OTHER PUBLICATIONS

International Preliminary Report on Patentability dated Aug. 25, 2016, from the International Bureau in counterpart International Application No. PCT/JP2015/054594.
International Search Report of PCT/JP2015/054594 dated May 19, 2015.
International Preliminary Report on Patentability of PCT/JP2015/054594 dated Oct. 1, 2015.
Office Action dated Nov. 7, 2017 from the Japanese Patent Office in counterpart Japanese Application No. 2014-030463.

* cited by examiner

REFLECTION MEMBER AVAILABLE FOR HEAT SHIELD USE AND PROJECTOR INCLUDING REFLECTION MEMBER

CROSS-REFERENCE TO RELATED APPLICATIONS

This application is a continuation of PCT International Application No. PCT/JP2015/054594 filed on Feb. 19, 2015, which claims priority under 35 U.S.C § 119 (a) to Japanese Patent Application No. 2014-030463 filed on Feb. 20, 2014, the entire content of which is incorporated herein by reference.

BACKGROUND OF THE INVENTION

1. Field of the Invention

The present invention relates to a reflection member available for heat shield use and a projector including a reflection member.

2. Description of the Related Art

A number of head up displays that display not only landscapes in front but also diverse information have been developed and put into practical use mainly for in-vehicle use. In head up display devices, for example, a projector is installed on or in the dashboard of a vehicle, and light that forms images is projected on the windshield or the combiner of the vehicle directly or through a mirror reflector or the like, thereby forming images visible to the driver of the vehicle (for example, JP2003-295105A).

Due to the above-described installation position, sunlight is easily incident on projectors for head up displays, and optical systems are also easily affected by the heat of sunlight directly or through a mirror reflector or the like. As means for mitigating the influences of the heat of sunlight, JP2005-315931A proposes the use of polarization members which include a linear rib portion formed therein and have a high heatproof temperature in head up display devices in which a liquid crystal panel is used.

Meanwhile, as means for shielding heat of sunlight and the like, generally, double glass coated with a special metal film that shields thermal radiation which is called low-E pair glass, heat ray-shielding sheets having a layer including an infrared-absorbing pigment (for example, JP1994-194517A (JP-H06-194517A)), and films in which a layer of a fixed cholesteric liquid crystal phase is used (for example, JP4109914B) are known.

SUMMARY OF THE INVENTION

As described above, head up display devices are often used in places where sunlight has a strong influence, and there is a demand for more efficient heat-shielding means. Regarding heat-shielding means, it is possible to obtain a lot of knowledge about means for shielding infrared light by means of reflection or absorption from the related art; however, in order for sufficient heat shielding, it is preferable to shield not only infrared light but also visible light. However, when visible light is shielded with reference to the knowledge of the related art, the projected image display function of head up display devices is impaired.

An object of the present invention is to provide a reflection member having a new constitution. Particularly, the object of the present invention is to provide a reflection member which can be used as a member for heat shielding and is capable of reducing damage to optical systems due to external light including visible light while efficiently extracting projected light even in a case in which the reflection member is used for heat shield use in optical systems in projectors. Another object of the present invention is to provide a projector including this reflection member.

The present inventors repeated intensive studies in order to achieve the above-described objects, paid attention to the use of a member designed in accordance with the optical characteristics of projected light from an optical system in a projector in order for efficient visible light shielding in head up display devices and the like, carried out additional studies, and completed the present invention.

That is, the present invention provides [1] to [20] described below.

[1] A reflection member comprising: a selective reflection layer; and two ¼ wavelength phase difference plates, in which the selective reflection layer is disposed between the two ¼ wavelength phase difference plates, the selective reflection layer includes a layer of a fixed cholesteric liquid crystal phase having a central wavelength of selective reflection at a visible light range wavelength $\lambda i$, and the selective reflection layer includes a layer in which a twisted direction of a helix of a cholesteric liquid crystal is only one of right or left as the layer of a fixed cholesteric liquid crystal phase having a central wavelength of selective reflection at the wavelength $\lambda i$.

[2] The reflection member according to [1], in which the selective reflection layer includes a layer in which the twisted direction of the helix of the cholesteric liquid crystal is only one of right or left as a layer of a fixed cholesteric liquid crystal phase exhibiting selective reflection at the wavelength $\lambda i$.

[3] The reflection member according to [1] or [2], in which the wavelength $\lambda i$ is in a red wavelength range, a green wavelength range, or a blue wavelength range.

[4] The reflection member according to any one of [1] to [3], in which the selective reflection layer includes a layer of a fixed cholesteric liquid crystal phase which has a central wavelength of selective reflection at a visible light range wavelength $\lambda n$ and has the twisted direction of the helix that is one of right or left and a layer of a fixed cholesteric liquid crystal phase which exhibits selective reflection at the wavelength $\lambda n$ and has the opposite twisted direction of the helix.

[5] The reflection member according to [4], comprising: both a layer in which the twisted direction of the helix is right and a layer in which the twisted direction of the helix is left as the layer of a fixed cholesteric liquid crystal phase having a central wavelength of selective reflection at the visible light range wavelength $\lambda n$.

[6] The reflection member according to [4] or [5], in which the wavelength $\lambda n$ is in a wavelength range other than the red wavelength range, the green wavelength range, and the blue wavelength range.

[7] The reflection member according to any one of [1] to [6], in which the selective reflection layer satisfies one or more selected from (RR), (RG), and (BB) below;

(RR) both a layer in which the twisted direction of the helix of the cholesteric liquid crystal is right and a layer in which the twisted direction of the helix of the cholesteric liquid crystal is left are included as a layer of a fixed cholesteric liquid crystal phase having a central wavelength of selective reflection in a wavelength range of 670 nm to 750 nm, (RG) both a layer in which the twisted direction of the helix of the cholesteric liquid crystal is right and a layer in which the twisted direction of the helix of the cholesteric liquid crystal is left are included as a layer of a fixed cholesteric liquid crystal phase having a central wavelength of selective reflection in a wavelength range of 550 nm to 600 nm, and (BB) both a layer in which the twisted direction of the helix of the cholesteric liquid crystal is right and a layer in which the twisted direction of the helix of the cholesteric liquid crystal is left are included as a layer of a fixed cholesteric liquid crystal phase having a central wavelength of selective reflection in a wavelength range of 400 nm to 430 nm.

[8] The reflection member according to [7], in which (RR), (RG), and (BB) are all satisfied.

[9] The reflection member according to any one of [1] to [8], in which the selective reflection layer includes two or more layers selected from a group consisting of an R layer of a fixed cholesteric liquid crystal phase having a central wavelength of selective reflection in a red wavelength range, a G layer of a fixed cholesteric liquid crystal phase having a central wavelength of selective reflection in a green wavelength range, and a B layer of a fixed cholesteric liquid crystal phase having a central wavelength of selective reflection in a blue wavelength range and includes layers in which a twisted direction of a helix of a cholesteric liquid crystal is only one of right or left as the layers selected from the R layer, the G layer, and the B layer.

[10] The reflection member according to [9], comprising: one or more R layers, one or more G layers, and one or more B layers, respectively.

[11] The reflection member according to [9] or [10], in which the red wavelength range is 610 nm to 650 nm, the green wavelength range is 510 nm to 540 nm, and the blue wavelength range is 440 nm to 470 nm.

[12] The reflection member according to any one of [1] to [11], in which slow axes of the two ¼ wavelength phase difference plates are parallel to each other.

[13] The reflection member according to any one of [1] to [12], comprising: an infrared light shielding layer.

[14] The reflection member according to any one of [1] to [13] which is used as a heat shielding member.

[15] A projector comprising: the reflection member according to any one of [1] to [14].

[16] The projector according to [15], comprising: an optical system that projects linearly polarized light.

[17] The projector according to [16] which is a projector for head up displays.

[18] The projector according to [16] or [17], comprising: a housing including the optical system and the reflection member, in which the housing includes a window portion for extracting light derived from the optical system outside the housing, and the reflection member is disposed between the window portion and the optical system.

[19] The projector according to [18], comprising: a mirror reflector that reflects the linearly polarized light in a direction of the window portion, in which the reflection member is disposed between the optical system and the mirror reflector.

[20] The projector according to [18], comprising: a mirror reflector that reflects the linearly polarized light in a direction of the window portion, in which the reflection member is disposed between the mirror reflector and the window portion.

According to the present invention, a reflection member having a new constitution is provided. The reflection member of the present invention can be used as a member for heat shielding and is capable of reducing damage to optical systems due to external light including visible light while efficiently extracting projected light even in a case in which the reflection member is used for heat shield use in optical systems in projectors. When the reflection member of the present invention is used in projectors for head up displays, it is possible to mitigate the deterioration of optical systems in the projectors.

DESCRIPTION OF THE PREFERRED EMBODIMENTS

Figure 1:
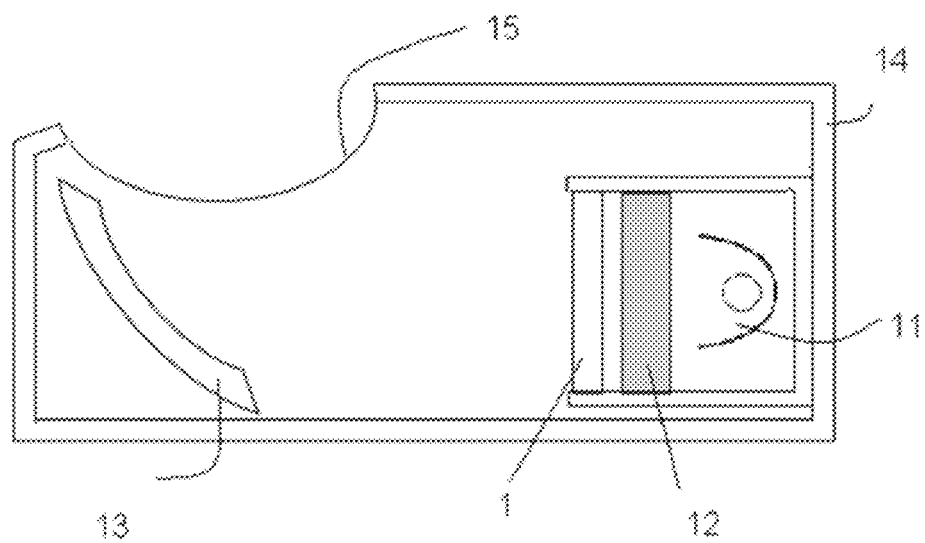
FIG. 1 is a schematic sectional view of an example of a projector for head up displays and a view illustrating an example of an installation location of a reflection member of the present invention.
Figure 2:
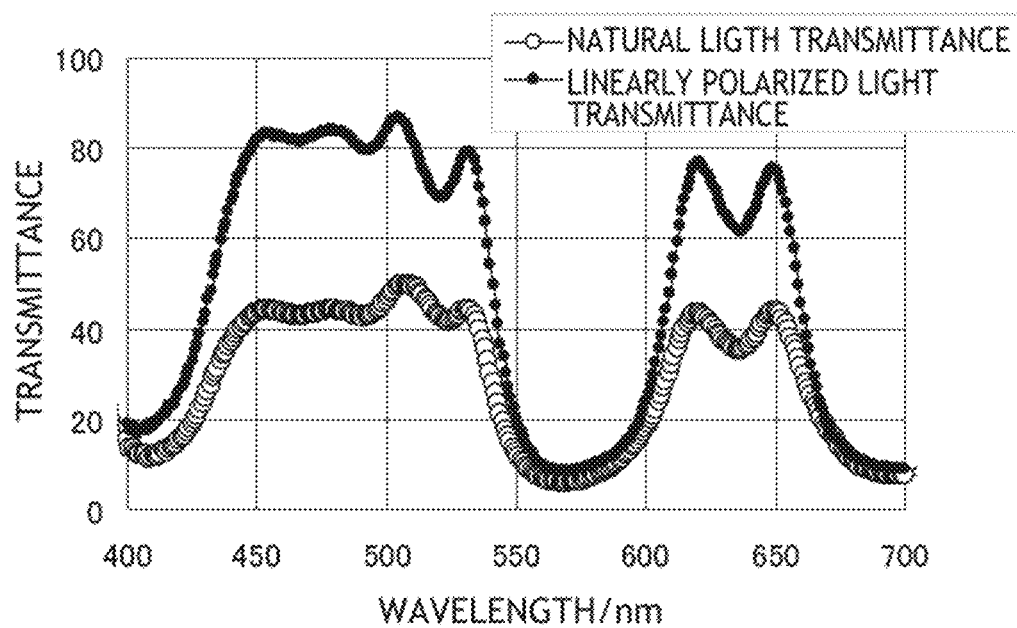
FIG. 2 is a view illustrating the transmittance of natural light and the transmittance of linearly polarized light of a film 1 produced in an example.
Figure 3:
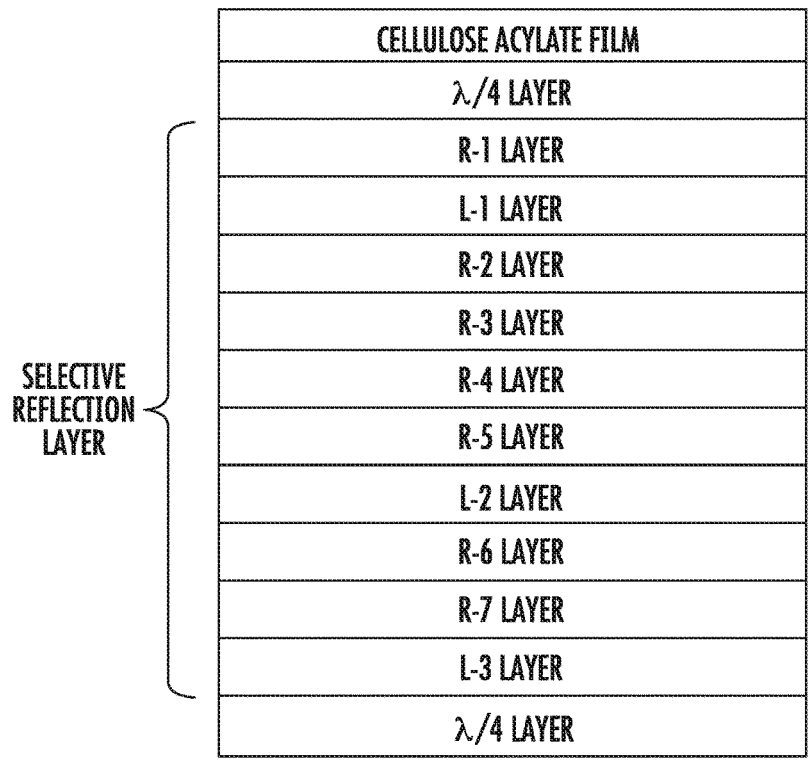
FIG. 3 is a schematic illustration of the film 1 of Example 1 described in Table 2 of this specification.
Figure 4:
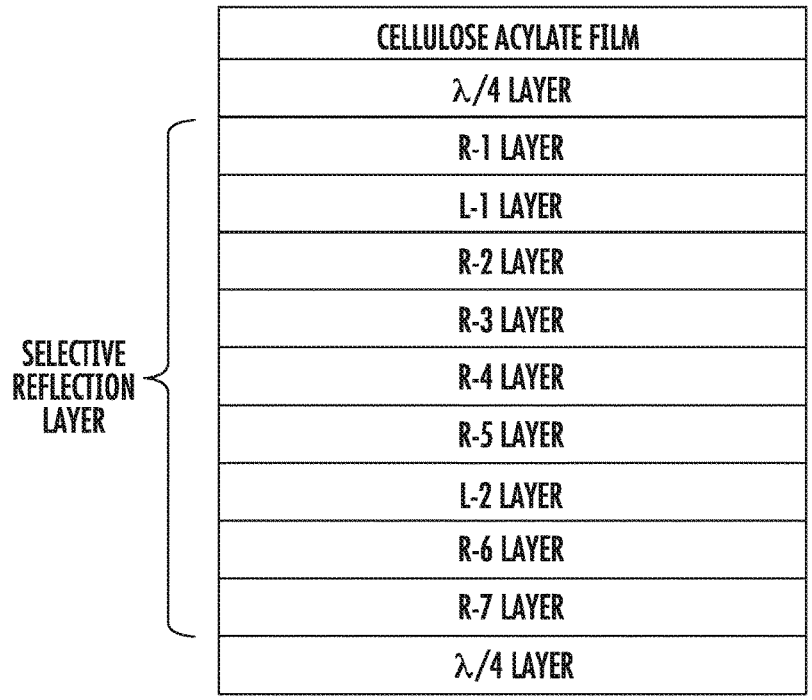
FIG. 4 is a schematic illustration of the film 2 of Example 2 described in Table 3 of this specification.
Figure 5:
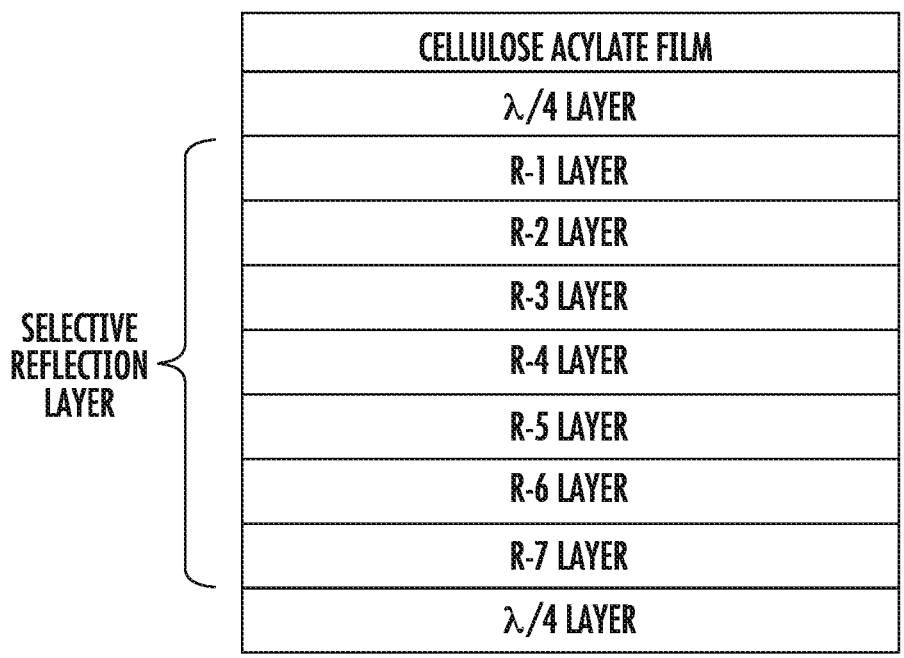
FIG. 5 is a schematic illustration of the film 3 of Example 3 described in Table 4 of this specification.

Hereinafter, the present invention will be described in detail.

Meanwhile, in the present specification, numeric ranges expressed using "to" include numeric values before and after the "to" as the lower limit value and the upper limit value. In the present specification, angles mentioned refer to angles in a range of the exact angle±an error of smaller than 5°. Furthermore, the error from the exact angle is preferably smaller than 4° and more preferably smaller than 3°.

In the present specification, when circularly polarized light is mentioned as "being selective", it means that the amount of light of any one of the right circularly polarized light component and the left circularly polarized light component of light being radiated is greater than that of the other circularly polarized light component. Specifically, when circularly polarized light is mentioned as "being selective", the degree of circular polarization of light is preferably 0.3 or higher, more preferably 0.6 or higher, and still more preferably 0.8 or higher. Substantially, the degree of circular polarization is still more preferably 1.0. Here, the degree of circular polarization refers to a value represented by $|I_R - I_L|/(I_R + I_L)$ in which $I_R$ represents the intensity of the right circularly polarized light component of light, and $I_L$ represents the intensity of the left circularly polarized light component of light.

In the present specification, when "sense" is mentioned regarding circularly polarized light, the sense indicates whether the circularly polarized light is right circularly polarized light or left circularly polarized light. Regarding the sense of circularly polarized light, in a case in which light coming closer is observed, in a case in which the front end of the electric field vector revolves clockwise as the time elapses, the circularly polarized light is defined as right circularly polarized light, and, in a case in which the front end thereof revolves counterclockwise, the circularly polarized light is defined as left circularly polarized light.

In the present specification, there are also cases in which a terminology of "sense" is used regarding the twisted direction of the helix of a cholesteric liquid crystal. In a case in which the twisted direction (sense) of the helix of a cholesteric liquid crystal is right, selective reflection by the cholesteric liquid crystal reflects right circularly polarized light and transmits left circularly polarized light, and, in a case in which the sense is left, the selective reflection reflects left circularly polarized light and transmits right circularly polarized light.

In the present specification, in a case in which "light" is mentioned, unless particularly otherwise described, the light refers to visible light (natural light). Visible light rays are, out of electromagnetic waves, light rays having wavelengths that are visible to human eyes and refer to light in a wavelength range of 380 nm to 780 nm.

In the present specification, the intensity of light which is required regarding the computation of light transmittance may be measured using the air as a reference with, for example, an ordinary visible spectrometer.

In the present specification, when simply "reflected light" or "transmitted light" is mentioned, scattered light and diffracted light are also considered to be included in the scope of the light.

Meanwhile, the polarization state of each wavelength of light can be measured using a spectral emission luminance meter or a spectrometer equipped with a circular polarization plate. In this case, the intensity of light measured using a right circular polarization plate corresponds to $I_R$, and the intensity of light measured using a left circular polarization plate corresponds to $I_L$. In addition, ordinary light sources such as incandescent bulbs, mercury lamps, fluorescent lamps, and LEDs emit natural light, but characteristics that produce the polarization of members mounted in ordinary light sources can be measured using, for example, a polarization phase difference analyzer AxoScan manufactured by AXOMETRICS, Inc. or the like.

In addition, polarization states can also be measured by attaching a measurement subject to an illuminometer or an optical spectrometer. When the amount of right circularly polarized light is measured with a right circular polarization transmission plate attached thereto, and the amount of left circularly polarized light is measured with a left circular polarization transmission plate attached thereto, the ratio therebetween can be measured.

<Reflection Member>

A reflection member includes a selective reflection layer and a ¼ wavelength phase difference plate. The reflection member includes two ¼ wavelength phase difference plates and includes the selective reflection layer between these two ¼ wavelength phase difference plates. That is, the reflection member includes the ¼ wavelength phase difference plate, the selective reflection layer, and the ¼ wavelength phase difference plate in this order. Other layers may or may not be included between the selective reflection layer and the ¼ wavelength phase difference plate. Examples of the other layers include an adhesive layer, an alignment layer, and the like. The reflection member preferably does not include any of layers that reflect or absorb natural light in the visible light range and layers that reflect or absorb polarization (linearly polarized light, elliptically polarized light, and circularly polarized light) in the visible light range except for the selective reflection layer.

The shape of the reflection member is not particularly limited and may be a film shape, a sheet shape, a plate shape, or the like of a thin film. As the film of a thin film, the reflection member may have a roll shape or the like. The reflection member may be used in a state of being adhered to another member.

<Selective Reflection Layer>

The selective reflection layer includes at least one layer of a fixed cholesteric liquid crystal phase. In the present specification, there are cases in which the layer of a fixed cholesteric liquid crystal phase is referred to as the cholesteric liquid crystal layer or the liquid crystal layer. The selective reflection layer may include one or more cholesteric liquid crystal layers. The selective reflection layer may include, for example, 2 to 50, 2 to 20, or 2 to 15 cholesteric liquid crystal layers. In addition, the selective reflection layer may include one kind of cholesteric liquid crystal layer having a homogeneous composition or may include two or more kinds of cholesteric liquid crystal layers having mutually different compositions. The selective reflection layer may include, for example, 2 to 50, 2 to 20, or 2 to 15 kinds of cholesteric liquid crystal layers. The selective reflection layer may include layers described below such as an alignment layer, a support, and an adhesive layer in addition to the cholesteric liquid crystal layer. Meanwhile, the selective reflection layer preferably does not include any light shielding layer that reflects or absorbs light (natural light).

<Layer of a Fixed Cholesteric Liquid Crystal Phase: Cholesteric Liquid Crystal Layer>

The cholesteric liquid crystal layer functions as a circularly polarized light selective reflection layer that, in a selective reflection band (selective reflection wavelength range), selectively reflects any one of right circularly polarized light and left circularly polarized light and transmits circularly polarized light with the other sense. That is, the sense of circularly polarized light being reflected is left when the sense of circularly polarized light being transmitted is right, and the sense of circularly polarized light being reflected is right when the sense of circularly polarized light being transmitted is left.

As films that exhibit circularly polarized light selective reflection properties, a number of films formed of a composition including a polymerizable liquid crystal compound have been thus far known, and, regarding the cholesteric liquid crystal layer, it is possible to refer to the related art thereof.

The cholesteric liquid crystal layer needs to be a layer in which the alignment of a liquid crystal compound forming a cholesteric liquid crystal phase is held and, typically, needs to be a layer which is obtained by forming a non-fluidic layer by polymerizing and curing a polymerizable liquid crystal compound that has been put into an alignment form of a cholesteric liquid crystal phase by means of irradiation with ultraviolet rays, heating, or the like and, at the same time, changing the layer into a state in which the alignment state is not changed due to an external field or an external force. Meanwhile, in the cholesteric liquid crystal layer, the optical properties of the cholesteric liquid crystal phase need to be held in the layer, and the liquid crystal compound in the layer does not need to exhibit liquid crystallinity any longer. For example, the polymerizable liquid crystal compound may be polymerized by means of a curing reaction and may lose liquid crystallinity at this time.

The cholesteric liquid crystal layer exhibits circularly polarized light reflection derived from the helix structure of the cholesteric liquid crystal. In the present specification, this circularly polarized light reflection will be referred to as selective reflection. The sense of the reflected circularly polarized light of the cholesteric liquid crystal layer coincides with the twisted direction of the helix. Individual cholesteric liquid crystal layers in the selective reflection layer have one of right or left twisted direction of the helix.

The central wavelength $\lambda$ of selective reflection is dependent on the pitch length P of the helix structure (=the period of the helix) in a cholesteric phase and follows a relationship of $\lambda = n \times P$ with the average refractive index n of the cholesteric liquid crystal layer. Meanwhile, in the present specification, the central wavelength λ of selective reflection in the cholesteric liquid crystal layer refers to a wavelength present at the location of the center of gravity of a reflection peak in a circularly polarized light reflection spectrum measured in the normal direction of the cholesteric liquid crystal layer. As is clear from the above-described equation, the central wavelength of selective reflection can be adjusted by adjusting the pitch length of the helix structure. That is, in order to selectively reflect, for example, any one of right circularly polarized light and left circularly polarized light with respect to blue light by adjusting the n value and the P value, it is possible to adjust the central wavelength λ so that the apparent central wavelength of selective reflection falls in a wavelength range of 450 nm to 495 nm. Meanwhile, the apparent central wavelength of selective reflection refers to a wavelength present at the location of the center of gravity of a reflection peak in a circularly polarized light reflection spectrum of the cholesteric liquid crystal layer measured in an observation direction during the practical use of the cholesteric liquid crystal layer. The pitch length of the cholesteric liquid crystal phase is dependent on the kind of a chiral agent that is used together with the polymerizable liquid crystal compound or the concentration of the chiral agent added, and thus it is possible to obtain a desired pitch length by adjusting the kind and the concentration thereof. Meanwhile, regarding a method for measuring the sense or pitch of the helix, it is possible to use a method described in p. 46 of "Introduction to Experimental Liquid Crystal Chemistry", by the Japanese Liquid Crystal Society, published by Sigma Publishing Co., Ltd. (2007) and p. 196 of "Liquid Crystal Handbook", by the editorial committee of liquid crystal handbook, published by Maruzen Publishing Co., Ltd.

In the selective reflection layer, the half-value width of the selective reflection band of each cholesteric liquid crystal layer is not particularly limited and may be 1 nm, 10 nm, 50 nm, 100 nm, 150 nm, 200 nm, or the like.

The half-value width Δλ (nm) of the selective reflection band in which circularly polarized light selective reflection is exhibited is dependent on the birefringence Δn of the liquid crystal compound and the pitch length P and follows a relationship of $\Delta\lambda = \Delta n \times P$. Therefore, the width of the selective reflection band can be controlled by adjusting Δn. Δn can be adjusted by adjusting the kind of the polymerizable liquid crystal compound or a mixing ratio thereof or by controlling the temperature during the fixing of alignment.

In order to form one kind of cholesteric liquid crystal layer having the same central wavelength of selective reflection, the period P may be the same, and multiple cholesteric liquid crystal layers having the sense of the same helix may be laminated together. When the period P is the same, and cholesteric liquid crystal layers having the sense of the same helix are laminated together, it is possible to enhance circularly polarized light selectivity at a specific wavelength.

When a cholesteric liquid crystal layer exhibiting selective reflection in the visible light range is produced using any one kind of liquid crystal compound described below, the half-value width of the selective reflection band is generally in a band of approximately 15 nm to 100 nm. In order to broaden the half-value width of the selective reflection band, two or more kinds of cholesteric liquid crystal layers in which the central wavelengths of reflected light with changed periods P are different need to be laminated together. At this time, cholesteric liquid crystal layers having the senses of the same helix are preferably laminated together. In addition, in one cholesteric liquid crystal layer, the half-value width of the selective reflection band can also be broadened by slowly changing the period P in the film thickness direction.

<Optical Characteristics of Selective Reflection Layer>

The selective reflection layer in the reflection member of the present invention includes a cholesteric liquid crystal layer having a central wavelength of selective reflection at a wavelength λi which is any wavelength in the visible light range and includes a layer in which the twisted direction of the helix of the cholesteric liquid crystal is only one of right or left as the layer of a fixed cholesteric liquid crystal phase having a central wavelength of selective reflection at the wavelength λi. The selective reflection layer preferably includes a layer in which the twisted direction of the helix of the cholesteric liquid crystal is only one of right or left as the layer of a fixed cholesteric liquid crystal phase exhibiting selective reflection at the wavelength λi. That is, the selective reflection layer may be constituted so as to selectively transmit only any one of right circularly polarized light and left circularly polarized light and selectively reflect the other circularly polarized light at any wavelength λi in the visible light range. The selective reflection layer may have one or more wavelengths λi at which what has been described above is satisfied. That is, in the selective reflection layer, the number of the central wavelengths of selective reflection at which only any one of right circularly polarized light and left circularly polarized light is selectively transmitted and the other circularly polarized light is selectively reflected may be one or more. Specifically, the selective reflection layer may also include two or more cholesteric liquid crystal layers having the wavelength λi. In the present specification, there are cases in which the above-described wavelength λi will be represented by adding the number thereof in accordance with the number thereof, for example, wavelength λi-1 or wavelength λi-2. Specifically, the selective reflection layer may have 1 to 5 wavelengths represented by one or more selected in a numeric order from, for example, wavelength λi-1, wavelength λi-2, wavelength λi-3, wavelength λi-4, and wavelength λi-5.

The wavelength λi can be selected in accordance with the use of the reflection member. For example, in a case in which the reflection member is used as a heat shielding member in a projector, the wavelength may be selected in accordance with the wavelength of light that the projector projects in order to display projected images. Particularly, in a case in which the projector is a projector which includes an optical system projecting linearly polarized light and displays projected images by projecting linearly polarized light, the wavelength may be in a wavelength range including the wavelength of the linearly polarized light and may be preferably the wavelength of the linearly polarized light thereof. This is because it is possible to selectively transmit circularly polarized light with any one sense generated by the projected light transmitted through the ¼ wavelength phase difference plate and selectively reflect circularly polarized light with the other sense. Typically, the wavelength λi is preferably in a red wavelength range, a green wavelength range, or a blue wavelength range. In addition, the wavelength λi-1 and the wavelength λi-2 are also preferably in any two wavelength ranges selected from the red wavelength range, the green wavelength range, and the blue wavelength range respectively, and the wavelength λi-1, the wavelength λi-2, and the wavelength λi-3 are also preferably in the red wavelength range, the green wavelength range, and the blue wavelength range respectively. This is because, in the reflection member or the like which is used in a conjunction with a projector which displays full color projected images and includes an optical system in which projected light is linearly polarized light, it is possible to selectively transmit and reflect projected light rays having individual wavelengths in preferred forms for use such as heat shield. In the present specification, there will be cases in which a layer in which the wavelength $\lambda i$ is in the red wavelength range is referred to the R layer, a layer in which the wavelength $\lambda i$ is in the green wavelength range is referred to the G layer, and a layer in which the wavelength $\lambda i$ is in the blue wavelength range is referred to the B layer, respectively.

The selective reflection layer in the reflection member of the present invention preferably includes a layer of a fixed cholesteric liquid crystal phase which has a central wavelength of selective reflection at the wavelength $\lambda n$ which is any wavelength in the visible light range and has a twisted direction of the helix that is one of right or left and a layer of a fixed cholesteric liquid crystal phase which exhibits selective reflection at the wavelength $\lambda n$ and has the opposite twisted direction of the helix. The wavelength $\lambda n$ is a wavelength different from the wavelength $\lambda i$ (for example, different by 20 nm or greater). That is, the selective reflection layer is preferably constituted so as to reflect any one of right circularly polarized light and left circularly polarized light at any wavelength $\lambda n$ in the visible light range. The selective reflection layer also preferably include both a layer in which the twisted direction of the helix is right and a layer in which the twisted direction of the helix is left as the layer of a fixed cholesteric liquid crystal phase having a central wavelength of selective reflection at the visible light range wavelength $\lambda n$. The number of the wavelengths $\lambda n$ may be one or more. That is, the number of the wavelengths in the visible light range at which the selective reflection layer reflects both right circularly polarized light and left circularly polarized light may be one or more. In the present specification, there are cases in which the above-described two or more wavelengths $\lambda n$ will be represented by adding the number thereof in accordance with the number thereof like wavelength $\lambda n-1$ or wavelength $\lambda n-2$ respectively. Specifically, the selective reflection layer may have 1 to 5 wavelengths represented by one or more selected in a numeric order from, for example, wavelength $\lambda n-1$, wavelength $\lambda n-2$, wavelength $\lambda n-3$, wavelength $\lambda n-4$, and wavelength $\lambda n-5$.

The wavelength $\lambda n$ can be selected in accordance with the use of the reflection member. For example, in a case in which the reflection member is used as a heat shielding member in a projector, the wavelength may be selected in accordance with the wavelength of light that the projector projects in order to display projected images. Specifically, the wavelength needs to be a wavelength in a wavelength range other than the wavelength of light that the optical system in the projector projects in order to display projected images. This is because it is possible to reflect circularly polarized light with any sense outside a wavelength range relating to the display of projected images. Typically, the wavelength $\lambda n$ is preferably outside the red wavelength range, the green wavelength range, and the blue wavelength range. In addition, the wavelength $\lambda n-1$ and the wavelength $\lambda n-2$ are also preferably in any two wavelength ranges selected from a wavelength range higher than the red wavelength range, a wavelength range between the red wavelength range and the green wavelength range, a wavelength range between the green wavelength range and the blue wavelength range, and a wavelength range lower than the blue wavelength range respectively, the wavelength $\lambda n-1$, the wavelength $\lambda n-2$, and the wavelength $\lambda n-3$ are also preferably in any three wavelength ranges selected from a wavelength range higher than the red wavelength range, a wavelength range between the red wavelength range and the green wavelength range, a wavelength range between the green wavelength range and the blue wavelength range, and a wavelength range lower than the blue wavelength range respectively, and the wavelength $\lambda n-1$, the wavelength $\lambda n-2$, the wavelength $\lambda n-3$, and the wavelength $\lambda n-4$ are also preferably in wavelength ranges selected from a wavelength range higher than the red wavelength range, a wavelength range between the red wavelength range and the green wavelength range, a wavelength range between the green wavelength range and the blue wavelength range, and a wavelength range lower than the blue wavelength range respectively. This is because, in the reflection member or the like which is used in a conjunction with a projector which displays full color projected images and includes an optical system in which projected light is linearly polarized light, it is possible to reflect projected light rays having individual wavelengths in preferred forms for use such as heat shield. The wavelength $\lambda n-1$, the wavelength $\lambda n-2$, and the wavelength $\lambda n-3$ being in wavelength ranges selected from a wavelength range higher than the red wavelength range, a wavelength range between the red wavelength range and the green wavelength range, and a wavelength range lower than the blue wavelength range respectively are also considered as a particularly preferred example.

The red wavelength range, the green wavelength range, or the blue wavelength range respectively refer to a wavelength range of light exhibiting red color, a wavelength range of light exhibiting green color, or a wavelength range of light exhibiting blue color. Persons skilled in the art are able to naturally understand specific wavelength ranges of the respective wavelength ranges. The red wavelength range, the green wavelength range, or the blue wavelength range may also be determined in accordance with, for example, the use of the reflection member. For example, in a case in which the reflection member is used as a heat shielding member in a projector, the wavelength ranges may be determined in accordance with the wavelength of projected light from the optical system in the projector. For example, when the projector is a projector for displaying full color projected images, typically, projected light has the maximum intensity of light in each of the red wavelength range, the green wavelength range, and the blue wavelength range, but it is possible to determine the red wavelength range, the green wavelength range, or the blue wavelength range by confirming the wavelength ranges on the basis of the light emission spectrum or the like of a light source. For example, in a case in which the reflection member is used as a heat shielding member in an optical system in which a laser is used as a light source, the red wavelength range, the green wavelength range, or the blue wavelength range can be narrowed.

The red wavelength range needs to be specifically, for example, in a range of 610 nm to 650 nm. The green wavelength range needs to be specifically, for example, in a range of 510 nm to 540 nm. In addition, the blue wavelength range needs to be specifically, for example, in a range of 440 nm to 470 nm. In addition, the wavelength ranges other than the red wavelength range, the green wavelength range, and the blue wavelength range need to be specifically, for example, in a range of 670 nm to 750 nm, a range of 550 nm to 600 nm, and a range of 400 nm to 430 nm.

<Method for Producing Selective Reflection Layer>

In a case in which the selective reflection layer includes multiple cholesteric liquid crystal layers, the cholesteric liquid crystal layers may be laminated together by laminating cholesteric liquid crystal layers that have been separately produced using an adhesive or the like or by directly applying a liquid crystal composition including a polymerizable liquid crystal compound and the like onto the surface of a previous cholesteric liquid crystal layer formed using a method described below and repeating a step of alignment and fixing.

<Method for Producing a Layer of Fixed Cholesteric Liquid Crystal Phase>

Hereinafter, a material and a method for producing the cholesteric liquid crystal layer will be described.

Examples of a material used to form the above-described cholesteric liquid crystal layer include a liquid crystal composition including a polymerizable liquid crystal compound and a chiral agent (optical active compound). The above-described liquid crystal composition obtained by further mixing a surfactant, a polymerization initiator, and the like as necessary with the above-described components and dissolving the mixture in a solvent or the like is applied onto a base material (a support, an alignment film, a cholesteric liquid crystal layer which serves as a underlayer, or the like), and the cholesteric alignment is aged and then fixed, whereby the cholesteric liquid crystal layer can be formed.

Polymerizable Liquid Crystal Compound

The polymerizable liquid crystal compound may be a rod-like liquid crystal compound or a disc-like liquid crystal compound, but is preferably a rod-like liquid crystal compound.

Examples of the rod-like polymerizable liquid crystal compound used to form the cholesteric liquid crystal layer include rod-like nematic liquid crystal compounds. As the rod-like nematic liquid crystal compound, azomethines, azoxys, cyano biphenyls, cyanophenyl esters, benzoic acid esters, cyclohexane carboxylic acid phenyl esters, cyanophenyl cyclohexanes, cyano-substituted phenyl pyrimidines, alkoxy-substituted phenyl pyrimidines, phenyl dioxanes, tolans, and alkenyl cyclohexyl benzonitriles are preferably used. Not only low-molecular-weight liquid crystal compounds but also high-molecular-weight liquid crystal compounds can be used.

The polymerizable liquid crystal compound can be obtained by introducing a polymerizable group into a liquid crystal compound. Examples of the polymerizable group include unsaturated polymerizable groups, epoxy groups, and aziridinyl groups, unsaturated polymerizable groups are preferred, and ethylenically unsaturated polymerizable groups are particularly preferred. A polymerizable group can be introduced into a liquid crystal compound using a variety of methods. The number of polymerizable groups in the polymerizable liquid crystal compound is preferably in a range of 1 to 6 and more preferably in a range of 1 to 3. Examples of the polymerizable liquid crystal compound include compounds described in Makromol. Chem., Vol. 190, p. 2255 (1989), Advanced Materials Vol. 5, p. 107 (1993), the specification of U.S. Pat. No. 4,683,327A, the specification of U.S. Pat. No. 5,622,648A, the specification of U.S. Pat. No. 5,770,107A, WO95/22586A, WO95/24455A, WO97/00600A, WO98/23580A, WO98/52905A, JP1989-272551A (JP-H01-272551A), JP1994-16616A (JP-H06-16616A), JP1995-110469A (JP-H07-110469A), JP1999-80081A (JP-H11-80081A), JP2001-328973A, and the like. Two or more kinds of polymerizable liquid crystal compounds may be jointly used. When two or more kinds of polymerizable liquid crystal compounds are jointly used, it is possible to lower the alignment temperature.

In addition, the amount of the polymerizable liquid crystal compound added to the liquid crystal composition is preferably in a range of 80% by mass to 99.9% by mass, more preferably in a range of 85% by mass to 99.5% by mass, and particularly preferably in a range of 90% by mass to 99% by mass of the mass (the mass excluding the solvent) of the solid content of the liquid crystal composition.

Chiral Agent (Optical Active Compound)

The chiral agent has a function of inducing the helix structure of the cholesteric liquid crystal phase. A chiral compound may be selected depending on the purpose since the sense of the helix or the helix pitch being induced varies depending on compounds.

The chiral agent is not particularly limited, and well-known compounds (for example, those described in p. 199, Section 4-3 Chiral agents for TN and STN, Chapter 3, Liquid Crystal Device Handbook, $142^{nd}$ Committee of Japan Society for the Promotion of Science, 1989), isosorbide, and isomannide derivatives can be used.

Generally, the chiral agent includes asymmetric carbon atoms, but axially asymmetric compounds or planarly asymmetric compounds including no asymmetric carbon atoms can also be used as the chiral agent. Examples of the axially asymmetric compounds or the planarly asymmetric compounds include binaphthyl, helicene, paracyclophane, and derivatives thereof. The chiral agent may have a polymerizable group. In a case in which both the chiral agent and the liquid crystal compound have a polymerizable group, it is possible to form a polymer having a repeating unit derived from the polymerizable liquid crystal compound and a repeating unit derived from the chiral agent by means of a polymerization reaction between the polymerizable chiral agent and the polymerizable liquid crystal compound. In this aspect, the polymerizable group in the polymerizable chiral agent is preferably the same group as the polymerizable group in the polymerizable liquid crystal compound. Therefore, the polymerizable group in the chiral agent is also preferably an unsaturated polymerizable group, an epoxy group, or an aziridinyl group, more preferably an unsaturated polymerizable group, and particularly preferably an ethylenically unsaturated polymerizable group.

In addition, the chiral agent may also be a liquid crystal compound.

In a case in which the chiral agent has a photoisomerization group, it is possible to form a pattern having a desired reflection wavelength corresponding to the light emission wavelength by means of photomask irradiation with active light rays or the like after coating and alignment, which is preferable. The photoisomerization group is preferably an isomerization portion of a compound exhibiting photochromic properties, azo, azoxy, or a cinnamoyl group. As specific compounds, it is possible to use compounds described in JP2002-80478A, JP2002-80851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent in the liquid crystal composition is preferably in a range of 0.01% by mole to 200% by mole and more preferably in a range of 1% by mole to 30% by mole of the amount of the polymerizable liquid crystal compound.

Polymerization Initiator

The liquid crystal composition preferably includes a polymerization initiator. In an aspect in which a polymerization reaction is performed by means of ultraviolet irradiation, the polymerization initiator being used is preferably a photopolymerization initiator capable of initiating a polymerization reaction by means of ultraviolet irradiation. Examples of the photopolymerization initiator include α-carbonyl compounds (described in the respective specifications of U.S. Pat. No. 2,367,661A and U.S. Pat. No. 2,367,670A), acyloin ethers (described in the specification of U.S. Pat. No. 2,448,828A), α-hydrocarbon-substituted aromatic acyloin compounds (the specification of U.S. Pat. No. 2,722,512A), polynuclear quinone compounds (described in the respective specifications of U.S. Pat. No. 3,046,127A and U.S. Pat. No. 2,951,758A), combinations of a triaryl imidazole dimer and p-amino phenyl ketone (described in the specification of U.S. Pat. No. 3,549,367A), acridine and phenazine compounds (described in JP1985-105667A (JP-S60-105667A) and the specification of U.S. Pat. No. 4,239,850A), oxadiazole compounds (described in the specification of U.S. Pat. No. 4,212,970A), and the like.

The content of the photopolymerization initiator in the liquid crystal composition is preferably in a range of 0.1% by mass to 20% by mass and more preferably in a range of 0.5% by mass to 5% by mass of the content of the polymerizable liquid crystal compound.

Crosslinking Agent

The liquid crystal composition may arbitrarily include a crosslinking agent in order to improve the film strength after curing and the durability. As the crosslinking agent, agents that are cured with ultraviolet rays, heat, moisture, or the like can be preferably used.

The crosslinking agent is not particularly limited and can be appropriately selected depending on the purpose. Examples thereof include polyfunctional acrylate compounds such as trimethylolpropane tri(meth)acrylate and pentaerythritol tri(meth)acrylate; epoxy compounds such as glycidyl (meth)acrylate and ethylene glycol diglycidyl ether; aziridine compounds such as 2,2-bishydroxymethyl butanol-tris[3-(1-aziridinyl)propionate] and 4,4-bis(ethylene imino carbonylamino) diphenylmethane; isocyanate compounds such as hexamethylene diisocyanate and biuret-type isocyanate; polyoxazoline compounds having an oxazoline group in a side chain; alkoxysilane compounds such as vinyltrimethoxysilane and N-(2-aminoethyl) 3-aminopropyl trimethoxysilane; and the like. In addition, well-known catalysts can be used in accordance with the reactivity of the crosslinking agent, and it is possible to improve not only the film strength and the durability but also the productivity. The crosslinking agent may be used singly, or two or more crosslinking agents may be jointly used.

The content of the crosslinking agent is preferably in a range of 3% by mass to 20% by mass and more preferably in a range of 5% by mass to 15% by mass. When the content of the crosslinking agent is lower than 3% by mass, there are cases in which an effect of improving the crosslinking density cannot be obtained, and, when the content thereof exceeds 20% by mass, there are cases in which the stability of the cholesteric liquid crystal layer is degraded.

Alignment-Controlling Agent

To the liquid crystal composition, an alignment-controlling agent that contributes to the stable and rapid provision of planar alignment to the cholesteric liquid crystal layer may be added. Examples of the alignment-controlling agent include fluorine (meth)acrylate-based polymers described in Paragraphs "0018" to "0043" of JP2007-272185A, compounds represented by Formulae (I) to (IV) in Paragraphs "0031" to "0034" of JP2012-203237A, and the like.

Meanwhile, the alignment-controlling agent may be used singly, or two or more alignment-controlling agents may be jointly used.

The amount of the alignment-controlling agent added to the liquid crystal composition is preferably in a range of 0.01% by mass to 10% by mass, more preferably in a range of 0.01% by mass to 5% by mass, and particularly preferably in a range of 0.02% by mass to 1% by mass of the total mass of the polymerizable liquid crystal composition.

Other Additives

Additionally, the liquid crystal composition may include at least one additive selected from a variety of additives such as a surfactant for adjusting the surface tension of a coated film and evening the film thickness and polymerizable monomers. In addition, to the liquid crystal composition, it is possible to further add a polymerization inhibitor, an antioxidant, an ultraviolet absorbent, a light stabilizer, a color material, metal oxide fine particles, and the like as necessary as long as the optical performance is not degraded.

Regarding the cholesteric liquid crystal layer, a liquid crystal composition obtained by dissolving the polymerizable liquid crystal compound and the polymerization initiator and, furthermore, the chiral agent, the surfactant, and the like which are added thereto as necessary, in a solvent is applied and dried on a support, an alignment layer, a cholesteric liquid crystal layer produced in advance, or the like, thereby obtaining a coated film, and the cholesteric liquid crystal composition is polymerized by irradiating this coated film with active light rays, whereby a cholesteric liquid crystal layer in which the cholesteric regularity is fixed can be formed. Meanwhile, a laminated film made up of multiple cholesteric liquid crystal layers can be formed by repeating the step of manufacturing the cholesteric liquid crystal layer.

The solvent used to prepare the liquid crystal composition is not particularly limited and can be appropriately selected depending on the purpose, but an organic solvent is preferably used.

The organic solvent is not particularly limited and can be appropriately selected depending on the purpose, and examples thereof include ketones, alkyl halides, amides, sulfoxides, heterocyclic compounds, hydrocarbons, esters, ethers, and the like. The organic solvent may be used singly, or two or more organic solvents may be jointly used. Among these, ketones are particularly preferred in a case in which the load on the environment is taken into account.

A method for applying the liquid crystal composition onto a base material is not particularly limited and can be appropriately selected depending on the purpose, and examples thereof include a wire bar coating method, a curtain coating method, an extrusion coating method, a direct gravure coating method, a reverse gravure coating method, a die coating method, a spin coating method, a dip coating method, a spray coating method, a slide coating method, and the like. In addition, it is also possible to transfer a liquid crystal composition that has been applied onto a separate support onto a base material. When the applied liquid crystal composition is heated, liquid crystal molecules are aligned. The heating temperature is preferably 200° C. or lower and more preferably 130° C. or lower. By means of this alignment treatment, an optical thin film in which the polymerizable liquid crystal compound is twist-aligned so as to have a helix axis in a direction that is substantially perpendicular to the film surface can be obtained.

The aligned liquid crystal compound may be further polymerized. Polymerization may be any of thermal polymerization and photopolymerization by means of light irradiation, but photopolymerization is preferred. In light irradiation, ultraviolet rays are preferably used. The irradiation energy is preferably in a range of 20 mJ/cm² to 50 J/cm² and more preferably in a range of 100 mJ/cm² to 1,500 J/cm². In order to accelerate the photopolymerization reaction, light irradiation may be carried out under a heating condition or in a nitrogen atmosphere. The wavelength of ultraviolet rays in irradiation is preferably in a range of 350 nm to 430 nm. The polymerization reaction percentage is preferably higher from the viewpoint of stability, and is preferably 70% or higher and more preferably 80% or higher. Regarding the polymerization reaction percentage, the consumption proportion of polymerizable functional groups can be determined using an IR absorption spectrum.

(Support)

The support is not particularly limited. The support used to form the cholesteric liquid crystal layer may be a temporary support that is peeled off after the formation of the cholesteric liquid crystal layer. In a case in which the support is a temporary support, the temporary support is not a layer that constitutes the reflection member, and thus there is no particular limitation regarding the optical characteristics such as transparency or refraction properties. As the support (temporary support), in addition to plastic films, glass or the like may be used. Examples of plastic films include polyesters such as polyethylene terephthalate (PET), polycarbonate, acrylic resins, epoxy resins, polyurethane, polyamide, polyolefin, cellulose derivatives, silicone, and the like.

The film thickness of the support needs to be in a range of approximately 5 μm to 1,000 μm and is preferably in a range of 10 μm to 250 μm and more preferably in a range of 15 μm to 90 μm.

(Alignment Film)

The alignment film can be provided using means such as a rubbing treatment of an organic compound or a polymer (a resin such as polyimide, polyvinyl alcohol, polyester, polyarylate, polyamideimide, polyetherimide, polyamide, or modified polyamide), the oblique evaporation of an inorganic compound, the formation of a layer having a micro group, or the accumulation of an organic compound (for example, ω-tricosanoic acid, dioctadecylmethylammonium chloride, or methyl stearate) using a Langmuir-Blodgett method (LB film). Furthermore, alignment films exhibiting an alignment function when put in an electric field or a magnetic field or irradiated with light are also known.

Particularly, for alignment films made of a polymer, it is preferable to apply a composition for forming a liquid crystal layer onto a rubbed surface of the film after a rubbing treatment. The rubbing treatment can be carried out by rubbing the surface of a polymer layer in a single direction with paper or a fabric several times.

The liquid crystal composition may be applied to the surface of the support or the rubbed surface of the support without providing the alignment film.

In a case in which the support is a temporary support, the alignment film may be peeled off together with the temporary support and thus not constitute the reflection member.

The thickness of the alignment layer is preferably in a range of 0.01 μm to 5 μm and more preferably in a range of 0.05 μm to 2 μm.

<¼ Wavelength Phase Difference Layer>

The ¼ wavelength phase difference layer needs to be a phase difference layer which functions as a ¼ wavelength plate in the visible light range. Examples of the ¼ wavelength layer include monolayer-type ¼ wavelength phase difference layers, broadband ¼ wavelength phase difference layers obtained by laminating a ¼ wavelength phase difference plate and a ½ wavelength phase difference plate, and the like.

The front surface phase difference of the former ¼ wavelength phase difference layer needs to be a length that is ¼ of the wavelength of projected light. Therefore, in a case in which the central wavelength of projected light is, for example, 450 nm, 530 nm, or 640 nm, a reverse dispersive phase difference layer having a phase difference that is 112.5 nm±10 nm, preferably 112.5 nm±5 nm, and more preferably 112.5 nm at a wavelength of 450 nm, is 132.5 nm±10 nm, preferably 132.5 nm±5 nm, and more preferably 132.5 nm at a wavelength of 530 nm, or is 160 nm±10 nm, preferably 160 nm±5 nm, and more preferably 160 nm at a wavelength of 640 nm is most preferred as the ¼ wavelength phase difference layer, but it is also possible to use a phase difference plate in which the wavelength dispersiveness of the phase difference is small or a dispersive phase difference plate. Meanwhile, 'being reverse dispersive' refers to a property in which the absolute value of the phase difference increases as the wavelength increases, and 'being dispersive' refers to a property in which the absolute value of the phase difference increases as the wavelength decreases.

The latter lamination-type ¼ wavelength phase difference layer is used in a manner in which the ¼ wavelength phase difference plate and the ½ wavelength phase difference plate are attached together so that the slow axes thereof form an angle of approximately 60 degrees, the ½ wavelength phase difference plate is disposed on the incidence side of linearly polarized light, and the slow axis of the ½ wavelength phase difference plate is intersected at 15 degrees or 75 degrees with respect to the polarization surface of the incident linearly polarized light, and the ¼ wavelength phase difference layer can be preferably used due to its favorable reverse dispersiveness of phase difference.

Meanwhile, the phase difference can be measured using a polarization phase difference analyzer AxoScan manufactured by AXOMETRICS, Inc. Alternatively, the phase difference may be measured by entering light having a predetermined wavelength in the film normal direction in KOBRA 21ADH or WR (manufactured by Oji Scientific Instruments).

As the ¼ wavelength phase difference layer, a commercially available product in which a birefringence material such as quartz is used may be used or the ¼ wavelength phase difference layer can be formed by arranging and fixing a polymerizable liquid crystal compound and a high-molecular-weight liquid crystal compound. The kind of the liquid crystal compound that is used for this formation is not particularly limited. In order to form the ¼ wavelength phase difference layer, it is also possible to refer to the liquid crystal composition and the production method which are used for the production of the above-described cholesteric liquid crystal layer. Here, the liquid crystal composition for forming the ¼ wavelength phase difference layer preferably does not include a chiral agent. For example, it is also possible to use an optically anisotropic layer obtained by forming a low-molecular-weight liquid crystal compound in a nematic alignment in a liquid crystal state and then fixing the liquid crystal compound by means of light crosslinking or thermal crosslinking or an optically anisotropic layer obtained by forming a high-molecular-weight liquid crystal compound in a nematic alignment in a liquid crystal state and then fixing the alignment by means of cooling.

The reflection member includes two ¼ wavelength phase difference layers. The compositions, the film thicknesses, and the like of the two ¼ wavelength phase difference layers may be identical to or different from each other.

In the reflection member, in a case in which the two ¼ wavelength phase difference layers are both monolayer-type phase difference layers, the directions of the slow axes of the ¼ wavelength phase difference layers are preferably parallel or orthogonal to each other. In addition, in a case in which the two ¼ wavelength phase difference layers are both bilayer-type phase difference layers, it is preferable in both ¼ wavelength phase difference layers to dispose the ¼ wavelength phase difference plates on the cholesteric liquid crystal layer side and dispose the ½ wavelength phase difference plates on the side opposite to the cholesteric liquid crystal layer in both ¼ wavelength phase difference layers and set the directions of the slow axes of the ½ wavelength phase difference plates to be parallel or orthogonal to each other. In addition, in a case in which the two ¼ wavelength phase difference layers are a monolayer-type phase difference layer and a bilayer-type phase difference layer respectively, it is preferable to dispose the bilayer-type ¼ wavelength phase difference plate on the cholesteric liquid crystal layer side, dispose the ½ wavelength phase difference plate on the side opposite to the cholesteric liquid crystal layer, and set the directions of the slow axis of the ½ wavelength phase difference plate and the slow axis of the monolayer-type ¼ wavelength phase difference layer to be parallel or orthogonal to each other.

<Adhesive Layer>

The reflection member may include an adhesive layer between the selective reflection layer and the ¼ wavelength phase difference plate or between the respective layers in the selective reflection layer. The adhesive layer needs to be a layer formed of an adhesive.

From the viewpoint of curing fashions, adhesives can be classified into hot melt-type adhesives, thermal curing-type adhesives, light curing-type adhesives, reaction curing-type adhesives, and pressure-sensitive adhesion-type adhesives which do not require curing, and, as materials for the respective adhesives, it is possible to use compounds such as acrylate-based compounds, urethane-based compounds, urethane acrylate-based compounds, epoxy-based compounds, epoxy acrylate-based compounds, polyolefin-based compounds, modified olefin-based compounds, polypropylene-based compounds, ethylene vinyl alcohol-based compounds, vinyl chloride-based compounds, chloroprene rubber-based compounds, cyanoacrylate-based compounds, polyamide-based compounds, polyimide-based compounds, polystyrene-based compounds, and polyvinyl butyral-based compounds. From the viewpoint of workability and productivity, the curing fashion is preferably the light curing type, and, from the viewpoint of optical transparency and heat resistance, acrylate-based compounds, urethane acrylate-based compounds, epoxy acrylate-based compounds, and the like are preferably used as the material.

The film thickness of the adhesive layer needs to be in a range of 0.5 μm to 10 μm and preferably in a range of 1 μm to 5 μm. A uniform film thickness is preferably provided in order to reduce color unevenness and the like in the reflection member.

<Infrared Light Shielding Layer>

The reflection member may include an infrared light reflection layer. In a case in which the reflection member is used as a heat shielding member, the inclusion of the infrared light shielding layer enables to provide more favorable heat shield performance to the reflection member. The infrared heat shielding layer may be a layer that reflects infrared light or a layer that absorbs infrared light.

Examples of the infrared light shielding layer include layers in which multiple metal layers are laminated together using a vacuum film formation method (for example, refer to JP1994-263486A (JP-H06-263486A)), layers including an infrared-absorbing pigment (for example, refer to JP1994-194517A (JP-H06-194517A)), and layers in which a layer of a fixed cholesteric liquid crystal phase is used (for example, refer to JP4109914B).

In a case in which the reflection member is used for, for example, heat shield use with respect to sunlight, the infrared light shielding layer is preferably used on the sunlight-receiving side of the selective reflection layer. This is because the deterioration of the selective reflection layers is prevented.

<Use of Reflection Member>

The reflection member can be used as visible light shielding members, heat shielding members, and the like. The reflection member can be preferably used as a heat shielding member in projectors, and particularly, can be preferably used as a member for shielding optical systems from heat in projectors including an optical system that projects linearly polarized light.

In the present specification, optical systems in projectors refer to portions including drawing devices such as light sources and optical modulators and refer to, for example, essential constitutions necessary to emit projected light for forming projected images which do not include additive members such as housings in ordinary projectors. Optical systems are not particularly limited as long as the optical systems have a function of projecting images. Examples of light sources in optical systems include laser light sources, LEDs, discharge tubes, and the like. In addition, examples of drawing devices in optical systems include liquid crystal panels, digital micromirror devices (DMD), grating light valves (GLV), liquid crystal on silicon (LCOS), microelectromechanical systems (MEMS), and the like.

The reflection member of the present invention is preferably used as a heat shielding member in projectors including optical systems that project linearly polarized light. In a case in which the reflection member of the present invention is provided in a projector including an optical system that projects linearly polarized light or is used in combination with a projector including an optical system that projects linearly polarized light, it is necessary to adjust the twisted direction of the cholesteric liquid crystal layer in accordance with the polarization directions of individual wavelengths of projected light from the optical system.

<Projectors for Head Up Displays>

Projectors to which the reflection member of the present invention is applied are not particularly limited, but preferred examples thereof include projectors used in head up displays. This is because head up display devices particularly require heat shield properties when used in vehicles that are easily affected by the heat of sunlight.

In projectors for head up displays, the reflection member needs to be provided on the optical system side of a projected image display portion in the sunlight incidence direction with respect to an optical system. The above-described constitution transmits projected light from the optical system through the reflection member and shields external light travelling toward the optical system.

FIG. 1 illustrates a schematic sectional view of an example of a projector for head up displays. In the drawing, the reflection member of the present invention is installed at the location 1, reference number 11 indicates a light source, reference number 12 indicates a drawing device, reference number 14 indicates a housing, reference number 15 indicates a window portion for extracting light derived from an optical system outside the housing, and reference number 13 indicates a mirror reflector that reflects projected light from the optical system in a window portion direction. In the projector for head up displays illustrated in FIG. 1, projected light from the optical system passes through the reflection member present at the location 1, is reflected at the mirror reflector 13, passes through the window portion 15, and displays projected images on a projected image display portion present at the upper portion of the window portion 15 in FIG. 1. External light such as sunlight is injected into the projector from the window portion 15, and some of visible light is reflected by the reflection member of the present invention present at the location 1, thereby shielding the optical system from heat. When the reflection member does not include an infrared light shielding layer, an infrared light shield filter is preferably provided at the location 1. In addition, the infrared light shield filter is preferably provided outside (external light reception side) the reflection member when seen from the optical system.

FIG. 1 illustrates a constitution in which the reflection member is provided between the optical system and the mirror reflector, but the reflection member may be provided between the mirror reflector and the window portion 15. In addition, a constitution in which the mirror reflector is not provided, and projected light from an optical system passes through the reflection member and is directly extracted from the window portion may also be employed.

EXAMPLES

Hereinafter, the present invention will be described more specifically using examples. Materials, reagents, the amounts and proportions of substances, operations, and the like described in the following examples can be appropriately modified within the scope of the gist of the present invention. Therefore, the scope of the present invention is not limited to the following examples.

<Production of Film 1>

A coating fluid R-1 having a right twist sense shown in Table 1 was applied onto a rubbed surface of PET manufactured by Fujifilm Corporation which had been subjected to a rubbing treatment using a wire bar at room temperature so that the thickness of the dried film after drying reached 3.5 μm. The coated layer was dried at room temperature for 30 seconds, then, was heated for two minutes in an atmosphere (85° C.), and then was irradiated with UV at 30° C. for 12 seconds using a D bulb (lamp: 90 mW/cm) manufactured by Fusion at an output of 60%, thereby obtaining an R-1 layer on the PET film. Similarly, the coating fluids shown in Table 1 were applied onto rubbed surfaces of PETs manufactured by Fujifilm Corporation which had been subjected to a rubbing treatment using a wire bar at room temperature so that the thicknesses of the dried films after drying reached the thicknesses shown in Table 2, and UV irradiation was carried out in the same manner as in the formation of the R-1 layer, thereby producing an L-1 layer, an R-2 layer, an R-3 layer, an R-4 layer, an R-5 layer, an L-2 layer, an R-6 layer, an R-7 layer, an L-3 layer, and a λ/4 layer, respectively.

The central wavelengths of reflection peaks of these cholesteric liquid crystal layers were measured using AxoScan manufactured by AXOMETRICS, Inc. The results are shown in Table 2.

TABLE 1

| Material (kind) | Material name (maker) | Coating fluid R-1 | Coating fluid R-2 | Coating fluid R-3 | Coating fluid R-4 | Coating fluid R-5 | Coating fluid R-6 | Coating fluid R-7 |
|---|---|---|---|---|---|---|---|---|
| Liquid crystal compound | Compound 1 | 80 parts by mass | 80 parts by mass | 80 parts by mass | 80 parts by mass | 80 parts by mass | 80 parts by mass | 80 parts by mass |
| | Compound 2 | 20 parts by mass | 20 parts by mass | 20 parts by mass | 20 parts by mass | 20 parts by mass | 20 parts by mass | 20 parts by mass |
| Polymerization initiator | Irg-819 (BASF) | 4 parts by mass | 4 parts by mass | 4 parts by mass | 4 parts by mass | 4 parts by mass | 4 parts by mass | 4 parts by mass |
| Alignment-controlling agent | Compound 3 | 0.05 parts by mass | 0.05 parts by mass | 0.05 parts by mass | 0.05 parts by mass | 0.05 parts by mass | 0.05 parts by mass | 0.05 parts by mass |
| | Compound 4 | 0.02 parts by mass | 0.02 parts by mass | 0.02 parts by mass | 0.02 parts by mass | 0.02 parts by mass | 0.02 parts by mass | 0.02 parts by mass |
| Acryl monomer | A-TMMT (Shin-Nakamura Chemical Co., Ltd.) | 1 part by mass | 1 part by mass | 1 part by mass | 1 part by mass | 1 part by mass | 1 part by mass | 1 part by mass |
| Chiral agent | LC-756 (BASF) | 6.7 parts by mass | 5.9 parts by mass | 5.6 parts by mass | 5.0 parts by mass | 4.7 parts by mass | 4.3 parts by mass | 3.9 parts by mass |
| Solvent | 2-Butanone (Wako Pure Chemical Industries, Ltd.) | Appropriately adjusted in accordance with film thickness | Appropriately adjusted in accordance with film thickness | Appropriately adjusted in accordance with film thickness | Appropriately adjusted in accordance with film thickness | Appropriately adjusted in accordance with film thickness | Appropriately adjusted in accordance with film thickness | Appropriately adjusted in accordance with film thickness |

| Material (kind) | Material name (maker) | Coating fluid L-1 | Coating fluid L-2 | Coating fluid L-3 | Coating fluid Q-1 |
|---|---|---|---|---|---|
| Liquid crystal compound | Compound 1 | 80 parts by mass | 80 parts by mass | 80 parts by mass | 80 parts by mass |
| | Compound 2 | 20 parts by mass | 20 parts by mass | 20 parts by mass | 20 parts by mass |
| Polymerization initiator | Irg-819 (BASF) | 4 parts by mass | 4 parts by mass | 4 parts by mass | 4 parts by mass |
| Alignment-controlling | Compound 3 | 0.05 parts by mass | 0.05 parts by mass | 0.05 parts by mass | 0.05 parts by mass |

TABLE 1-continued

| agent | Compound 4 | 0.02 parts by mass | 0.02 parts by mass | 0.02 parts by mass | 0.02 parts by mass |
|---|---|---|---|---|---|
| Monomer | A-TMMT (Shin-Nakamura Chemical Co., Ltd.) | 1 part by mass | 1 part by mass | 1 part by mass | 1 part by mass |
| Chiral agent | Compound 5 | 10.5 parts by mass | 7.4 parts by mass | 6.2 parts by mass | 0 parts by mass |
| Solvent | 2-Butanone (Wako Pure Chemical Industries, Ltd.) | Appropriately adjusted in accordance with film thickness | Appropriately adjusted in accordance with film thickness | Appropriately adjusted in accordance with film thickness | Appropriately adjusted in accordance with film thickness |

Compound 1

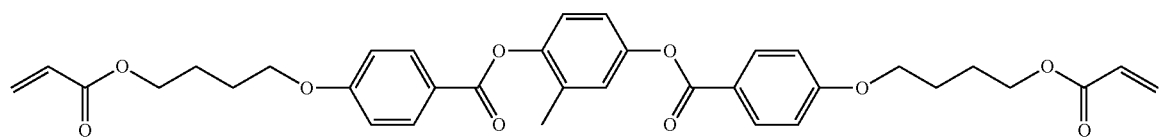

Compound 2

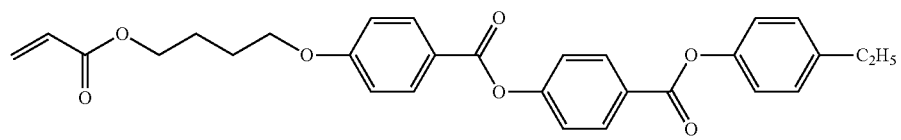

Compound 3

Compound 4

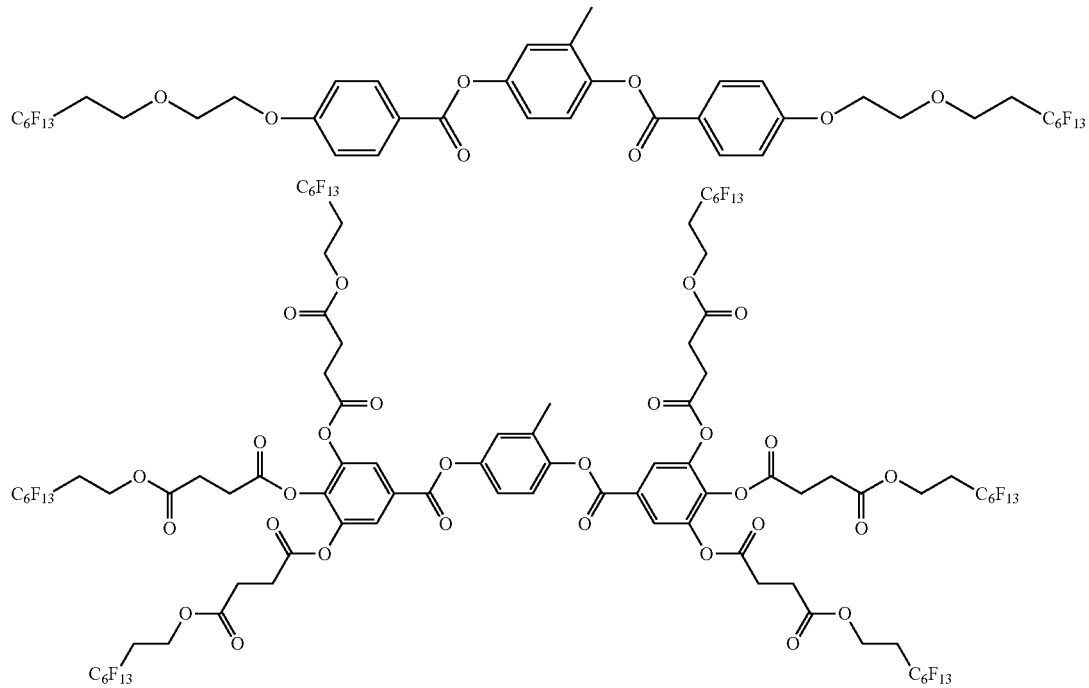

Compound 5

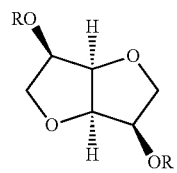

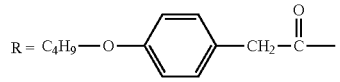

$R = C_4H_9-O-\langle\bigcirc\rangle-CH_2-\overset{O}{\overset{\|}{C}}-$

TABLE 2

Example 1 (film 1)

| Optical layer | Coating fluid | Selective reflection central wavelength | Sense of helix | Layer thickness/μm |
|---|---|---|---|---|
| Cellulose acylate film | — | — | — | — |
| λ/4 layer | Q-1 | — | — | 0.7 |
| R-1 layer | R-1 | 410 nm | Right | 3.5 |
| L-1 layer | L-1 | 410 nm | Left | 3.5 |
| R-2 layer | R-2 | 465 nm | Right | 3.5 |
| R-3 layer | R-3 | 490 nm | Right | 4 |
| R-4 layer | R-4 | 540 nm | Right | 4 |
| R-5 layer | R-5 | 580 nm | Right | 4 |
| L-2 layer | L-2 | 580 nm | Left | 4 |
| R-6 layer | R-6 | 635 nm | Right | 4 |
| R-7 layer | R-7 | 695 nm | Right | 4.5 |
| L-3 layer | L-3 | 695 nm | Left | 4.5 |
| λ/4 layer | Q-1 | — | — | 0.7 |

Next, a cellulose acylate transparent film which had a thickness of 40 μm, had a front surface retardation of 0 nm, and had an antireflection layer attached on a single side was prepared, and a UV curing-type adhesive Exp. U12034-6 manufactured by DIC Corporation was applied onto a surface opposite to the antireflection layer using a wire bar at room temperature so that the thickness of the dried film after drying reached 5 μm. This coated surface and a surface on the liquid crystal layer side of a PET-attached λ/4 layer produced using a coating fluid Q-1 were attached together while being careful about the entry of air bubbles, and were irradiated with UV at 30° C. for 12 seconds using a D bulb (lamp: 90 mW/cm) manufactured by Fusion at an output of 60%. After that, the PET serving as a support of the λ/4 layer was peeled off. The value of retardation at a wavelength of 550 nm which was obtained by measuring the front surface retardation of the cellulose acylate film-attached λ/4 layer using AxoS can manufactured by AXOMETRICS, Inc. was 137 nm.

Subsequently, cholesteric liquid crystal layers of the R-1 layer through the L-3 layer shown in Table 2 were sequentially adhered onto the λ/4 layer using the above-described UV curing-type adhesive, and the PET film was repeatedly peeled off, thereby laminating ten cholesteric layers on the λ/4 layer. Finally, a UV curing-type adhesive Exp. U12034-6 manufactured by DIC Corporation was applied onto a surface of a PET-attached λ/4 layer, which was produced using the coating fluid Q-1 in the same manner, on the liquid crystal layer side using a wire bar at room temperature so that the thickness of the dried film after drying reached 5 μm, was attached to the L-3 layer on the top surface of the cholesteric layer-laminated film produced above so that the slow axis of the λ/4 layer became parallel to the slow axis of the λ/4 layer which had been first attached to the cellulose acylate film, and the PET manufactured by Fujifilm Corporation which served as a support of the λ/4 layer was peeled off, thereby forming a film 1 of Example 1.

<Production of Film 2>

A film 2 of Example 2 shown in Table 3 was formed in the same manner as in Example 1 except for the fact that the cholesteric L-3 layer was not laminated.

TABLE 3

Example 2 (film 2)

| Optical layer | Coating fluid | Selective reflection central wavelength | Sense of helix | Layer thickness/μm |
|---|---|---|---|---|
| Cellulose acylate film | — | — | — | — |
| λ/4 layer | Q-1 | — | — | 0.7 |
| R-1 layer | R-1 | 410 nm | Right | 3.5 |
| L-1 layer | L-1 | 410 nm | Left | 3.5 |
| R-2 layer | R-2 | 465 nm | Right | 3.5 |
| R-3 layer | R-3 | 490 nm | Right | 4 |
| R-4 layer | R-4 | 540 nm | Right | 4 |
| R-5 layer | R-5 | 580 nm | Right | 4 |
| L-2 layer | L-2 | 580 nm | Left | 4 |
| R-6 layer | R-6 | 635 nm | Right | 4 |
| R-7 layer | R-7 | 695 nm | Right | 4.5 |
| λ/4 layer | Q-1 | — | — | 0.7 |

<Production of Film 3>

A film 3 of Example 3 shown in Table 4 was formed in the same manner as in Example 1 except for the fact that the cholesteric L-1 layer, L-2 layer, and L-3 layer were not laminated.

TABLE 4

Example 3 (film 3)

| Optical layer | Coating fluid | Selective reflection central wavelength | Sense of helix | Layer thickness/μm |
|---|---|---|---|---|
| Cellulose acylate film | — | — | — | — |
| λ/4 layer | Q-1 | — | — | 0.7 |
| R-1 layer | R-1 | 410 nm | Right | 3.5 |
| R-2 layer | R-2 | 465 nm | Right | 3.5 |
| R-3 layer | R-3 | 490 nm | Right | 4 |
| R-4 layer | R-4 | 540 nm | Right | 4 |
| R-5 layer | R-5 | 580 nm | Right | 4 |
| R-6 layer | R-6 | 635 nm | Right | 4 |
| R-7 layer | R-7 | 695 nm | Right | 4.5 |
| λ/4 layer | Q-1 | — | — | 0.7 |

<Evaluation of Films>

The linearly polarized light transmittances and the natural light transmittances of the films were measured using a UV-Vis/NIR spectrophotometer V-670 manufactured by JASCO Corporation. The transmittance of linearly polarized light was measured by disposing a linear polarization plate on the light source side of the spectrophotometer so that the polarization transmission axis and the slow axis of the λ/4 plate in the film formed 45 degrees. The measurement result of the film 1 is shown in FIG. 1. The average value of the natural light transmittances obtained as described above in a wavelength range of 400 nm to 700 nm and the average transmittance with respect to linearly polarized light at the light emission central wavelengths of an LED light source in a liquid crystal display device used in the evaluation which were in ranges of 465 nm±5 nm, 525 nm±5 nm, and 630 nm±5 nm are shown in Table 5.

Since the natural light transmittance is the same as the transmittance with respect to sunlight entering the liquid crystal display device after passing through the film, a lower natural light transmittance indicates superior performance. Meanwhile, since the linearly polarized light transmittance corresponds to the transmittance of projected light emitted from the liquid crystal display device, as the value thereof increases, the liquid crystal display device is capable of displaying brighter images. Therefore, as the linearly polarized light transmittance/the natural light transmittance of the film increases, the extraction efficiency of projected light increases, and the heat shield properties also become higher.

Next, in the projector for head up displays having the constitution illustrated in FIG. 1, the film 1, the film 2, and the film 3 were disposed at the location 1 of FIG. 1 in the housing made of a black light shield synthetic resin, furthermore, infrared shield filters (SC1201 manufactured by Asahi Spectra Co., Ltd.) were disposed on the mirror reflector 13 side of the respective films, and the temperature rise suppression effects of the TN-TFT liquid crystal display panel were measured. A constitution in which only infrared shield filter was disposed at the location 1 was prepared, and measurement was carried out in the same manner as in Comparative Example 1. In all the measurements, sunlight was focused in the panel by adjusting the location of the entire device, and then the temperatures were measured after one hour. The temperatures were measured with a thermocouple directly attached to the surface of a central portion of the panel. The results are shown in Table 5.

TABLE 5

| | Film used | Temperature rise due to sunlight | Linearly polarized light transmittance | Natural light transmittance | Linearly polarized light transmittance/ natural light transmittance |
|---|---|---|---|---|---|
| Example 1 | 1 | 67° C. | 74% | 28% | 2.6 |
| Example 2 | 2 | 71° C. | 74% | 31% | 2.4 |
| Example 3 | 3 | 81° C. | 75% | 43% | 1.7 |
| Comparative Example 2 | None | 105° C. | 100% | 100% | 1.0 |

EXPLANATION OF REFERENCES

1: disposition location of reflection member
11: light source
12: drawing device
13: recessed surface mirror reflector
14: housing
15: window portion

What is claimed is:

1. A reflection member for shielding an optical system that projects linearly polarized light from heat, comprising:
 a selective reflection layer; and
 two ¼ wavelength phase difference plates,
 wherein the selective reflection layer is disposed between the two ¼ wavelength phase difference plates,
 the selective reflection layer includes a layer of a fixed cholesteric liquid crystal phase, having a central wavelength of selective reflection at a wavelength $\lambda i$ in a wavelength range of the linearly polarized light,
 the selective reflection layer includes a layer in which a twisted direction of a helix of a cholesteric liquid crystal is only one of right or left as the layer of a fixed cholesteric liquid crystal phase having a central wavelength of selective reflection at the wavelength $\lambda i$,
 the selective reflection layer includes a layer of a fixed cholesteric liquid crystal phase which has a central wavelength of selective reflection at the wavelength $\lambda n$ and has the right twisted direction of the helix and a layer of a fixed cholesteric liquid crystal phase which exhibits selective reflection at the wavelength $\lambda n$ and has the left twisted direction of the helix, and
 the wavelength $\lambda n$ is a wavelength different from the wavelength $\lambda i$.

2. The reflection member according to claim 1,
 wherein the selective reflection layer includes a layer in which the twisted direction of the helix of the cholesteric liquid crystal is only one of right or left as a layer of a fixed cholesteric liquid crystal phase, exhibiting selective reflection at the wavelength $\lambda i$.

3. The reflection member according to claim 1,
 wherein the wavelength $\lambda i$ is a wavelength $\lambda i$-1 in a red wavelength range, a wavelength $\lambda i$-2 in a green wavelength range, and a wavelength $\lambda i$-3 in a blue wavelength range.

4. The reflection member according to claim 3,
 wherein the red wavelength range is 610 nm to 650 nm, the green wavelength range is 510 nm to 540 nm, and the blue wavelength range is 440 nm to 470 nm.

5. The reflection member according to claim 1,
 wherein the selective reflection layer includes
 a layer of a fixed cholesteric liquid crystal phase which has a central wavelength of selective reflection at a wavelength $\lambda i$-1 in a red wavelength range,
 a layer of a fixed cholesteric liquid crystal phase which has a central wavelength of selective reflection at a wavelength $\lambda i$-2 in a green wavelength range,
 a layer of a fixed cholesteric liquid crystal phase which has a central wavelength of selective reflection at a wavelength $\lambda i$-3 in a blue wavelength range,
 a layer of a fixed cholesteric liquid crystal phase which has a central wavelength of selective reflection at a visible light range wavelength $\lambda n$ and has the right twisted direction of the helix and
 a layer of a fixed cholesteric liquid crystal phase which exhibits selective reflection at the wavelength $\lambda n$ and has the left twisted direction of the helix and
 wherein the selective reflection layer includes a layer in which the twisted direction of the helix of the cholesteric liquid crystal is only one of right or left as each of the layers of fixed cholesteric liquid crystal phases which exhibits selective reflection at the wavelength $\lambda i$-1, $\lambda i$-2 or $\lambda i$-3, and
 the wavelength $\lambda n$ is a wavelength different from any of the wavelength $\lambda i$-1, $\lambda i$-2 or $\lambda i$-3.

6. The reflection member according to claim 5,
 wherein the red wavelength range is 610 nm to 650 nm, the green wavelength range is 510 nm to 540 nm, and the blue wavelength range is 440 nm to 470 nm.

7. The reflection member according to claim 5,
 wherein the selective reflection layer satisfies one or more selected from (RR), (RG), and (BB) below;
 (RR) both a layer in which the twisted direction of the helix of the cholesteric liquid crystal is right and a layer in which the twisted direction of the helix of the cholesteric liquid crystal is left are included as a layer of a fixed cholesteric liquid crystal phase having a central wavelength of selective reflection in a wavelength range of 670 nm to 750 nm,
 (RG) both a layer in which the twisted direction of the helix of the cholesteric liquid crystal is right and a layer in which the twisted direction of the cholesteric liquid crystal is left are included as a layer of a fixed cholesteric liquid crystal phase having a central wavelength of selective reflection in a wavelength range of 550 nm to 600 nm, and (BB) both a layer in which the twisted direction of the helix of the cholesteric liquid crystal is right and a layer in which the twisted direction of the helix of the cholesteric liquid crystal is left are included as a layer of a fixed cholesteric liquid crystal phase having a central wavelength of selective reflection in a wavelength range of 400 nm to 430 nm.

8. The reflection member according to claim 7, wherein (RR), (RG), and (BB) are all satisfied.

9. A projector comprising:
the reflection member according to claim 5, and
an optical system that projects linearly polarized light.

10. The reflection member according to claim 1,
wherein the selective reflection layer satisfies one or more selected from (RR), (RG), and (BB) below;

(RR) both a layer in which the twisted direction of the helix of the cholesteric liquid crystal is right and a layer in which the twisted direction of the helix of the cholesteric liquid crystal is left are included as a layer of a fixed cholesteric liquid crystal phase having a central wavelength of selective reflection in a wavelength range of 670 nm to 750 nm, (RG) both a layer in which the twisted direction of the helix of the cholesteric liquid crystal is right and a layer in which the twisted direction of the helix of the cholesteric liquid crystal is left are included as a layer of a fixed cholesteric liquid crystal phase having a central wavelength of selective reflection in a wavelength range of 550 nm to 600 nm, and (BB) both a layer in which the twisted direction of the helix of the cholesteric liquid crystal is right and a layer in which the twisted direction of the helix of the cholesteric liquid crystal is left are included as a layer of a fixed cholesteric liquid crystal phase having a central wavelength of selective reflection in a wavelength range of 400 nm to 430 nm.

11. The reflection member according to claim 10,
wherein (RR), (RG), and (BB) are all satisfied.

12. The reflection member according to claim 1,
wherein slow axes of the two ¼ wavelength phase difference plates are parallel to each other.

13. The reflection member according to claim 1, comprising:
an infrared light shielding layer.

14. A projector comprising:
the reflection member according to claim 1, and
an optical system that projects linearly polarized light.

15. The projector according to claim 14 which is a projector for head up displays.

16. The projector according to claim 14, comprising:
a housing including the optical system and the reflection member,
wherein the housing includes a window portion for extracting light derived from the optical system outside the housing, and the reflection member is disposed between the window portion and the optical system.

17. The projector according to claim 16, comprising:
a mirror reflector that reflects the linearly polarized light in a direction of the window portion,
wherein the reflection member is disposed between the optical system and the mirror reflector.

18. The projector according to claim 16, comprising:
a mirror reflector that reflects the linearly polarized light in a direction of the window portion,
wherein the reflection member is disposed between the mirror reflector and the window portion.

* * * * *